US008353395B2

(12) United States Patent
Pederson

(10) Patent No.: US 8,353,395 B2
(45) Date of Patent: Jan. 15, 2013

(54) HELICAL AUGER PLUG SYSTEMS

(76) Inventor: Harold Pederson, Decorah, IA (US)

( * ) Notice: Subject to any disclaimer, the term of this patent is extended or adjusted under 35 U.S.C. 154(b) by 150 days.

(21) Appl. No.: 13/037,374

(22) Filed: Mar. 1, 2011

(65) Prior Publication Data

US 2011/0271600 A1 Nov. 10, 2011

Related U.S. Application Data

(60) Provisional application No. 61/331,972, filed on May 6, 2010.

(51) Int. Cl.
*F16L 55/10* (2006.01)

(52) U.S. Cl. ............... 198/670; 198/657; 198/860.3; 220/288; 138/89; 138/93

(58) Field of Classification Search .......... 198/657–677, 198/502.1, 860.3; 138/89, 93; 220/284, 220/288, 315, 801
See application file for complete search history.

(56) References Cited

U.S. PATENT DOCUMENTS

| 4,274,786 | A | * | 6/1981 | Svensson et al. | 414/218 |
|---|---|---|---|---|---|
| 4,415,303 | A | * | 11/1983 | Westendorf et al. | 414/519 |
| 4,458,829 | A | * | 7/1984 | Greenfield et al. | 222/129.3 |
| 4,540,086 | A | * | 9/1985 | David et al. | 198/536 |
| 5,208,108 | A | * | 5/1993 | Russell et al. | 428/398 |
| 5,267,696 | A | * | 12/1993 | Balmer | 239/662 |
| 5,330,078 | A | * | 7/1994 | Ficken et al. | 222/129.4 |
| 5,398,814 | A | * | 3/1995 | Sime | 209/285 |
| 5,651,193 | A |   | 7/1997 | Rhodes et al. |   |
| 5,845,762 | A |   | 12/1998 | Stark |   |
| 6,688,336 | B2 | * | 2/2004 | Trichard | 138/89 |
| 7,490,629 | B2 | * | 2/2009 | Williams et al. | 138/89 |
| 8,042,680 | B2 | * | 10/2011 | Pottmann | 198/677 |
| 2006/0157323 | A1 |   | 7/2006 | Dutschke |   |

* cited by examiner

*Primary Examiner* — Mark A Deuble
(74) *Attorney, Agent, or Firm* — RG Patent Consulting LLC

(57) ABSTRACT

A conical-shaped plug member integrally comprising soft, porous foam material and having a helical profile for plugging the gap space in between the flights of an auger when an auger is not in use. Helical auger plug systems may comprise a removably attachable flag to indicate when the plug member is in use (inserted). The plug member of the present invention is designed to reduce the loss of heat (or cooling air) within/from a grain bin during the heating and drying process while preventing rodents and other animals from entering the grain storage bin through the auger flightings and infesting the grain.

20 Claims, 6 Drawing Sheets

HELICAL AUGER PLUG SYSTEMS

CROSS-REFERENCE TO RELATED APPLICATION

The present application is related to and claims priority from prior provisional application Ser. No. 61/331,972, filed May 6, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of plugs and more specifically relates to a helically molded auger plug to prevent rodents from entering the auger and to minimize the loss of heat from within a granary during drying operations.

2. Description of the Related Art

Plugging devices (plugs) are instruments which may be used to seal openings. The primary functions of an effective plug are generally to provide a temporary and convenient sealing means to help contain contents within an enclosure having an opening. Plugs have a wide range of use and form as theoretically there are virtually an unlimited number of objects that might need a plug. Plugs often vary in shape, size, and color. Some plugs provide insulation while others simply prevent leakage.

A grain auger is used in agriculture to move grain from trucks and grain carts into grain storage bin and/or from grain storage bins back into trucks and/or grain carts for transport to a grain handling facility. The grain storage bin is a sizable structure used to store various types of grains. Grain augers may be powered by an electric motor; a tractor, via the power take-off; or sometimes an internal combustion engine mounted on the auger. The helical flighting rotates inside a long tube, moving the grain upwards. Some grain augers are integral within the grain storage bins. These in-bin augers move the grain to a hopper which may then be augered from a portable auger into the truck or grain cart. The grain may then be hauled to a destination for selling or feeding the grain. If the grain is not dry when placed in storage drying may be employed to decrease the moisture content so the grain is safe to store thereby avoiding spoilage and loss of income to the farmer.

With the ever-rising cost of energy, individuals and companies working in the agriculture industry are always looking for ways to increase the effectiveness and efficiency of their production and storage methods. Any loss of heat from the drying process slows the drying process and decreases the cost-effectiveness of such activities. Currently, the auger tube remains open in between uses allowing warm air to escape also disrupting the uniform airflow throughout the bin. Further, this open condition makes the grain bin vulnerable to a rodent infestation, which may infest and deplete the harvested grains. A plug device is needed that remedies these problems.

Various attempts have been made to solve the above-mentioned problems such as those found in U.S. Pat. and Pub. Nos. 5,208,108; 4,415,303; 5,651,193; 5,845,762; 2006/0157323; and 4,540,086. This prior art is representative of plugging means. None of the above inventions and patents, taken either singly or in combination, is seen to describe the invention as claimed.

Ideally, an auger plug should be user-friendly, safe in-use, and, yet operate reliably and be manufactured at a modest expense. Thus, a need exists for a reliable auger plug to fit securely around an auger flighting thereby occupying the open space of the auger tube to prevent heat loss and avoid access by rodents as well as to avoid the above-mentioned problems.

BRIEF SUMMARY OF THE INVENTION

In view of the foregoing disadvantages inherent in the known plugging means art, the present invention provides a novel helical auger plug system. The general purpose of the present invention, which will be described subsequently in greater detail, is to provide a heat retaining and rodent deterring means.

The present invention as disclosed herein, the helical auger plug system comprises a plug, the plug preferably comprising a soft, spongy material generally in the shape of a cone with a rounded top and having a helical profile such that it may be inserted into an auger opening into contact with the flighting. The plug is designed for use in isolating the contents of the grain storage bin (granary) from outside elements.

As described in detailed herein, a novel plug for use with an auger is disclosed. The auger plug of the present invention may generally comprise a conical-shaped plug member comprising a soft, porous foam material having a helical profile. One object of the auger plug is to fill the gap space in between the flights of an auger drill when the auger is not in use. The auger plug of helical auger plug systems may further comprise a removably attachable flag to indicate when the auger plug is in use so that a farmer doesn't start the auger and destroy the device. The plug member of the present invention is also intended to reduce the loss of heat out of a grain bin during the heating and drying process(es). Further, the auger plug may serve as a barrier preventing rodents and other animals from entering the grain bin through the auger flightings and possibly causing degradation of the grain quality and quantity.

The auger plug may further comprise a tip manufactured of a rigid material such as plastic, other embodiments may comprise rubber. The rigid tip may be used to grip for initiating the insertion process into the auger tube. To insert the auger plug into the auger tube, the user simply inserts the tip (distal end) of the auger plug into contact with the flighting of the auger. Since the auger plug comprises helical flightings throughout the entire member, the auger plug may be rotatably screwed around the auger drill when the auger is turned off until a closed-inserted position is obtained. Once the auger plug is tightly screwed in, the gap space between the flights of the auger is filled by the foam material (in adjacent-touch-contact), thereby blocking access to rodents while also retaining heat within the grain bin.

In a preferred embodiment of the present invention, the auger plug may comprise the shape and color of an ear of corn. Further, the removably attachable flag may comprise a bright color. In such a manner, both the auger plug and flag will be easy to spot by the user even from a distance. When the user observes the flag attached to the member, it indicates that the plug member is in use and the auger should not be operated while the plug member is inserted.

In an alternative embodiment, an inflatable version of the auger plug may be provided. The inflatable version may be inserted in a similar manner as the non-inflatable version. Once the auger plug is initially inserted into the flight of the auger, the user may inflate the plug via pneumatic means to a user-preferred size. The inflatable version may comprise a sturdy and tear-proof outer bladder to minimize damage to the auger plug by the auger flighting blades.

The present invention holds significant improvements and serves as a helical auger plug system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, helical auger plug systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a helical auger plug system and more particularly to a soft, spongy plugging device to fit securely around an auger flighting within the tube to occupy the open space, thus denying rodents and other harmful animals from crawling into a grain bin while optimizing heat retention therein during grain drying operations.

In the agricultural industry, workers in the grain and agriculture field(s) often rely on augers to transfer and their grain into and from grain bins. For example, augers are commonly used to transfer grain from a grain bin to the farmer's truck, as previously mentioned. This is a regular process in the farming business in transporting grain from the farm to the distributor for sale of such grains. Ideally the grain is stored in a clean and dry state; however, much hard work and labor is regularly and systematically undone by pesky rodents and other critters that crawl into the grain bin and infest the grain. Rodents are able to gain access to the inside of a grain bin through the flightings of an auger drill even if the bin access door is shut. Further, much heat is typically lost through the auger opening during drying operations which slow down the grain moisture removing process. The steady and constant loss of heat may require the farmer to install a larger heating fan or to blow warm air (for aeration drying) for a longer period, which inevitably leads to higher electric bills. Further, a dryer may be in communication with the grain bin (not shown) to remove excess moisture from grain. An effective auger plug 110 is disclosed herein to provide an insulating and isolating means for auger 210 used in conjunction with grain bin 225.

Figure 1:
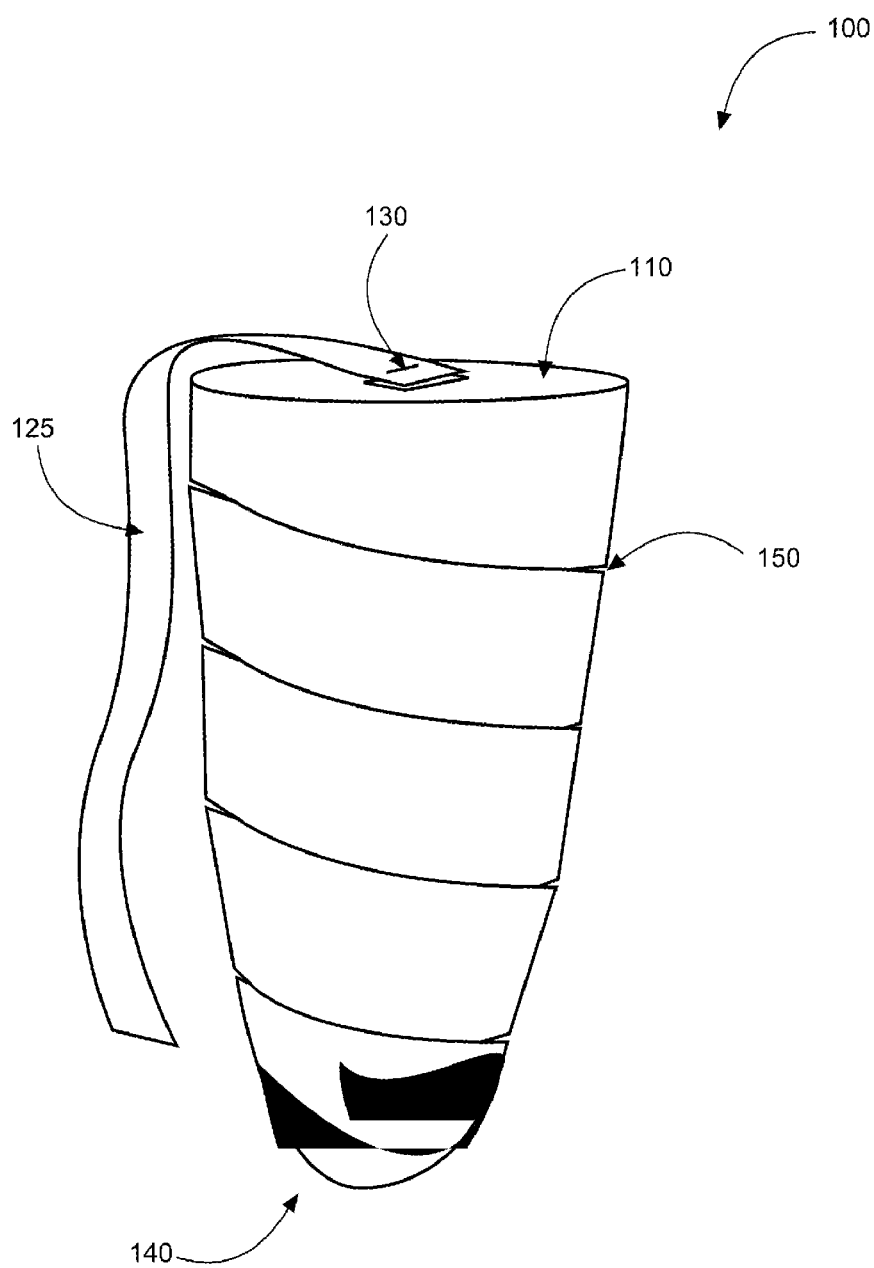
FIG. 1 shows a perspective view illustrating helical auger plug systems comprising helical flighting conforming means (cuts) and a removably attachable flag at the base according to an embodiment of the present invention.

In referring to FIG. 1, a perspective view of helical auger plug systems 100 is shown according to one embodiment of the present invention. As illustrated, helical auger plug systems 100 may comprise auger plug 110 having a conical-type shape and preferably comprising a soft, spongy foam material. Auger plug 110 may comprise tip 140 wherein tip 140 preferably comprises a hard plastic material. Auger plug 110 further comprises helical flightings 150 (contour-matching slits to flightings) wherein helical flightings comprise insertable slits having a helical profile. The helical profile of helical flightings 150 is designed such that auger plug 110 may be rotatably insertable around auger drill 210.

In further reference to FIG. 1, auger plug 110 may comprise a flag 125 that is removably attachable to auger plug 110 via flag fastener 130. As shown in FIG. 1, flag 125 and flag fastener 130 may be located on the base of auger plug 110. In a preferred embodiment of helical auger plug systems 100, flag 125 comprises a strand of brightly colored material. It should be appreciated that flag 125 may be made available in different colors and designs to appeal to the consumer market. Furthermore, flag fastener 130 may comprise hook and loop fasteners or Velcro® attached to auger plug 110 thereby providing a removably detachable means for flag 125.

Figure 2:
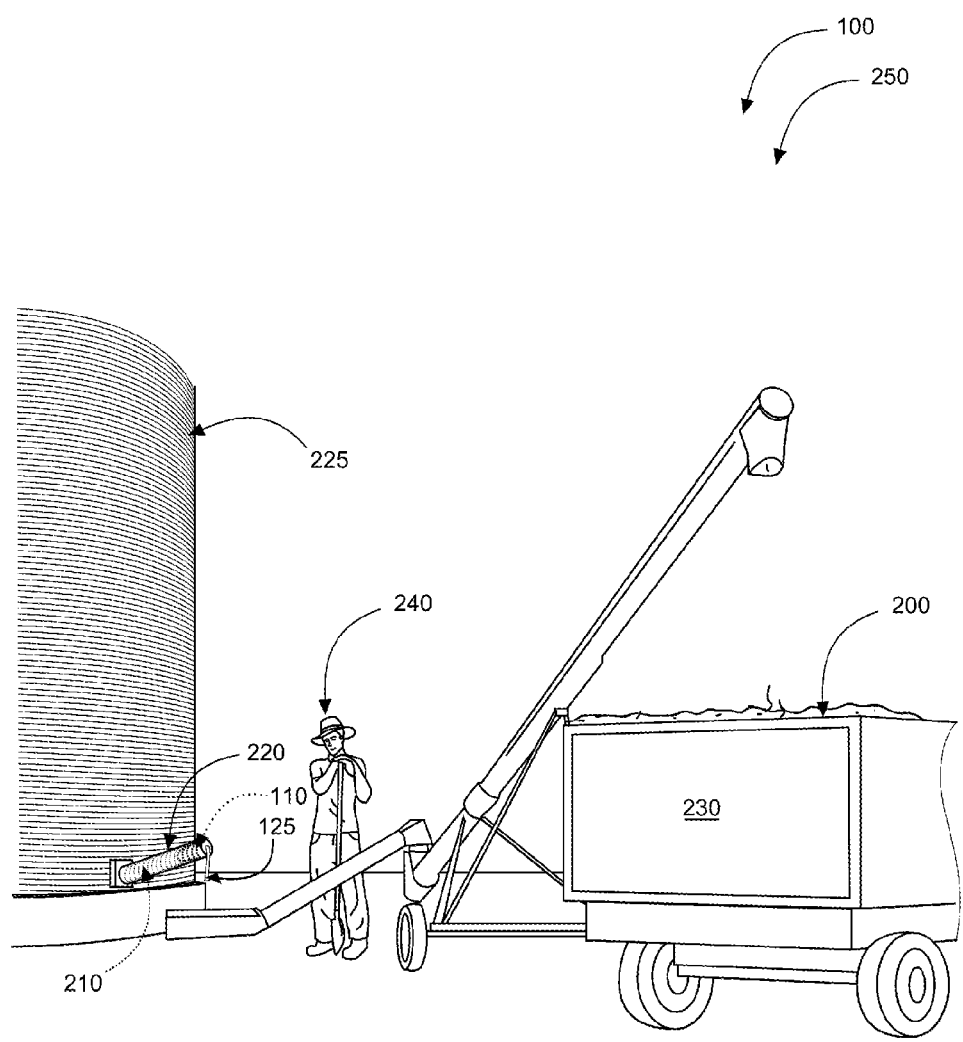
FIG. 2 is a perspective view illustrating helical auger plug systems in an in-use condition according to an embodiment of the present invention of FIG. 1.

FIG. 2 shows a perspective view illustrating helical auger plug systems 100 in an in-use condition 250 according to an embodiment of the present invention. As illustrated, auger plug 110 may be positioned to fill the open space of auger 210. Once user 240 finishes drying grain 200 and is ready to finish work for the day, helical auger plug systems 100 may be used to plug the auger opening of grain bin 225. Flag 125 may be clearly visible via the brightly colored material and may indicate to user 240 that auger plug 110 is in an in-use condition 250 (inserted within auger tube) and therefore auger 210 should not be powered or used until auger plug 110 is removed.

Figure 3:
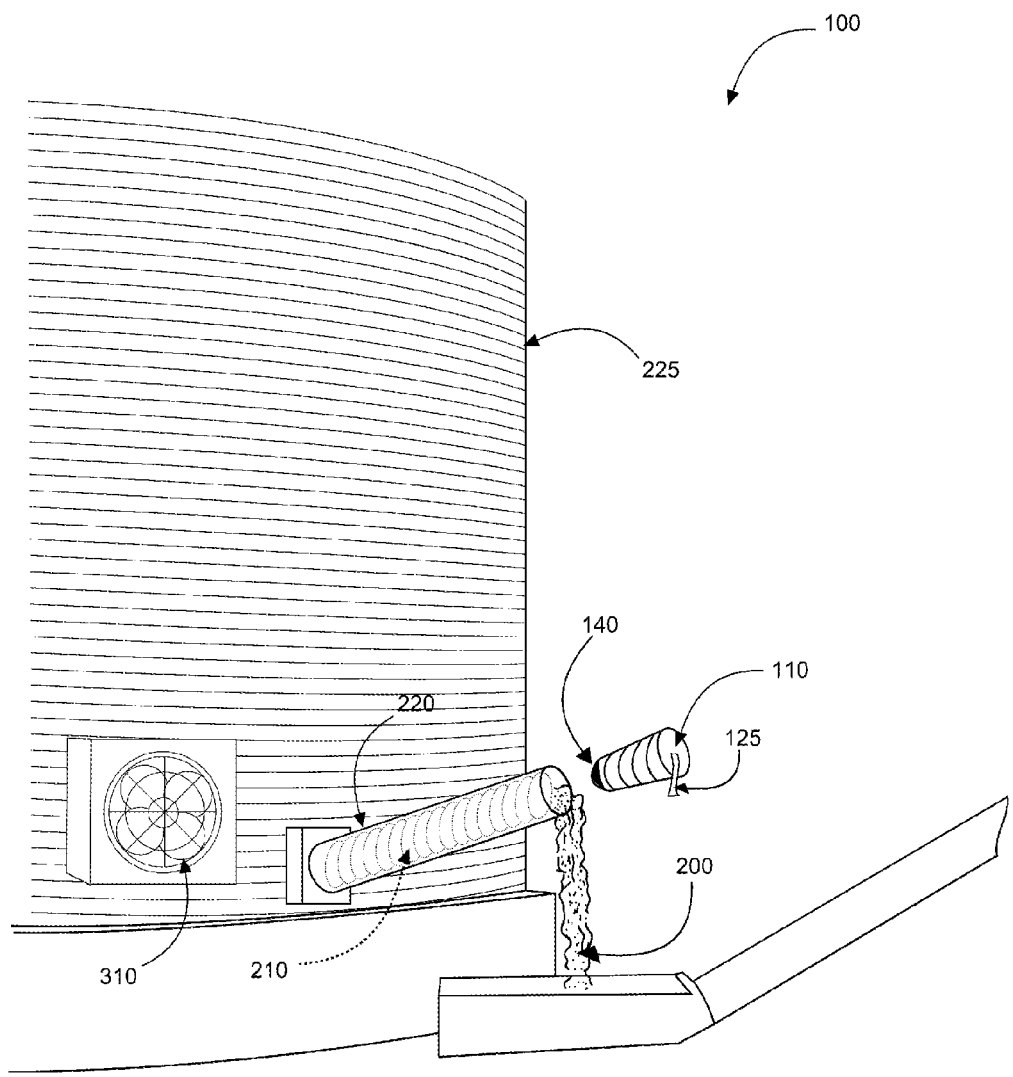
FIG. 3 is a perspective view illustrating helical auger plug systems removed from blocking auger tube thereby allowing grain to freely pass into a truck for transport according to an embodiment of the present invention of FIG. 1.

FIG. 3 is a perspective view illustrating auger plug 110 being rotatably inserted into auger 210. Heating fan 310 is shown on side of grain bin 225 and used to dry grain 200. Auger plug 110 is optimally used during periods of non-use of auger 210 and may serve to help retain heat within grain bin 225 during grain drying episodes. To apply auger plug 110 to auger 210, tip 140 comprising plastic material may be used to initially insert auger plug 110 around helical flightings 150 of auger 210. In such a manner, auger plug 110 may be "screwed" onto auger 210. Once firmly in place, auger plug 110 comprising foam material will occupy the open space between helical flightings 150 and thereby restrict the loss of hot air generated by heating fan 310. Auger plug 110 is preferably manufactured of durable yet pliable foam material so that it may be used with different sized augers 210.

Figure 4:
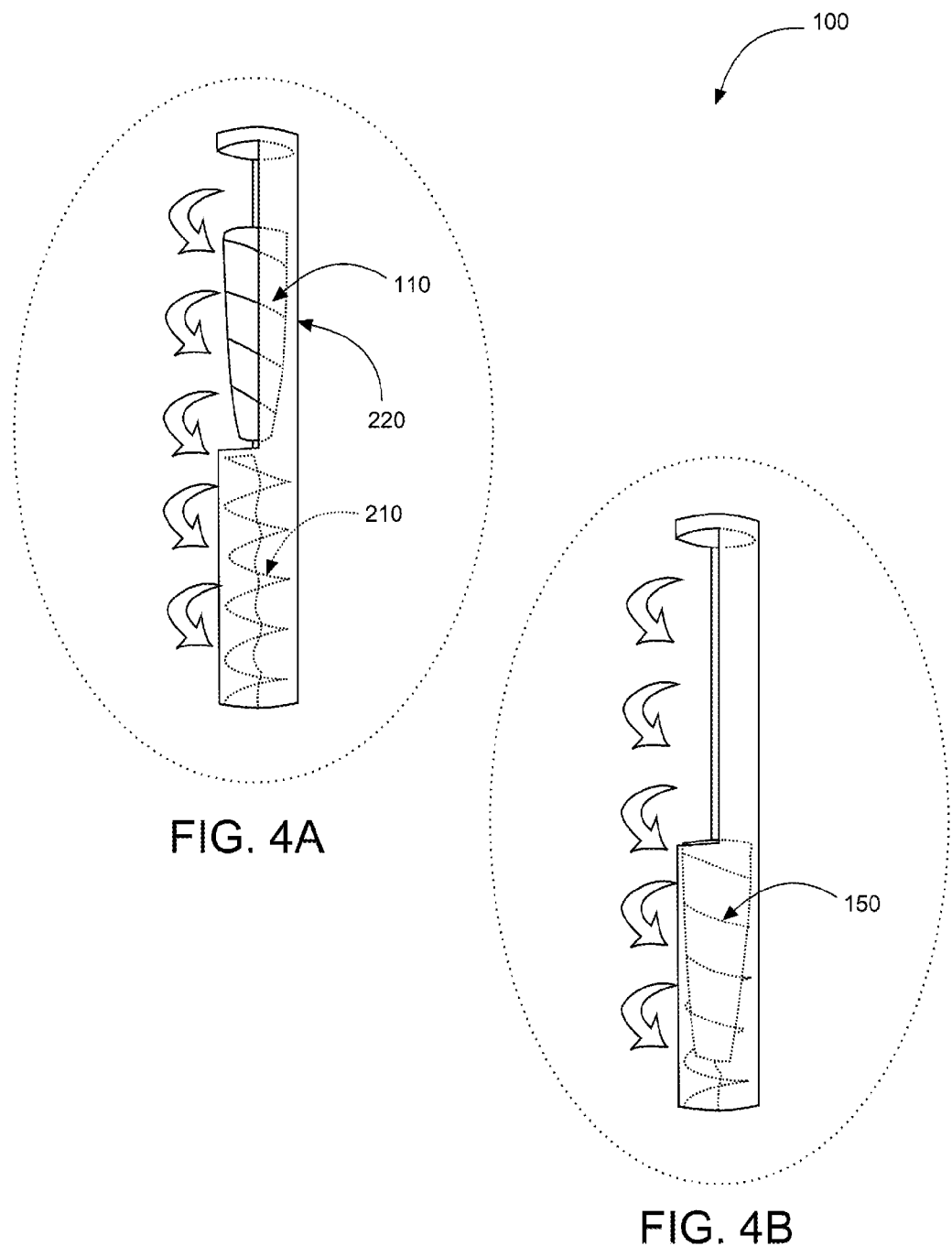
FIGS. 4A and 4B are side perspective views illustrating helical auger plug systems which may be positioned directly in the auger tube in touch contact with the helical flightings according to an embodiment of the present invention of FIG. 1.

FIGS. 4A and 4B show side perspective views of helical auger plug systems 100 according to an embodiment of the present invention. As best seen in FIG. 4A, auger plug 110 may be rotably inserted about helical flightings 150 beginning with tip 140. By continuing to screw auger plug 110 around helical flightings 150 of auger 210, auger plug may be firmly positioned to occupy vacant space within tubular encasement 220. In such a manner, there will be no 'open space' between helical flightings 150 of auger 210 and therefore heat loss will be minimized while outside creatures will be prevented from entering grain bin 225.

Figure 5:
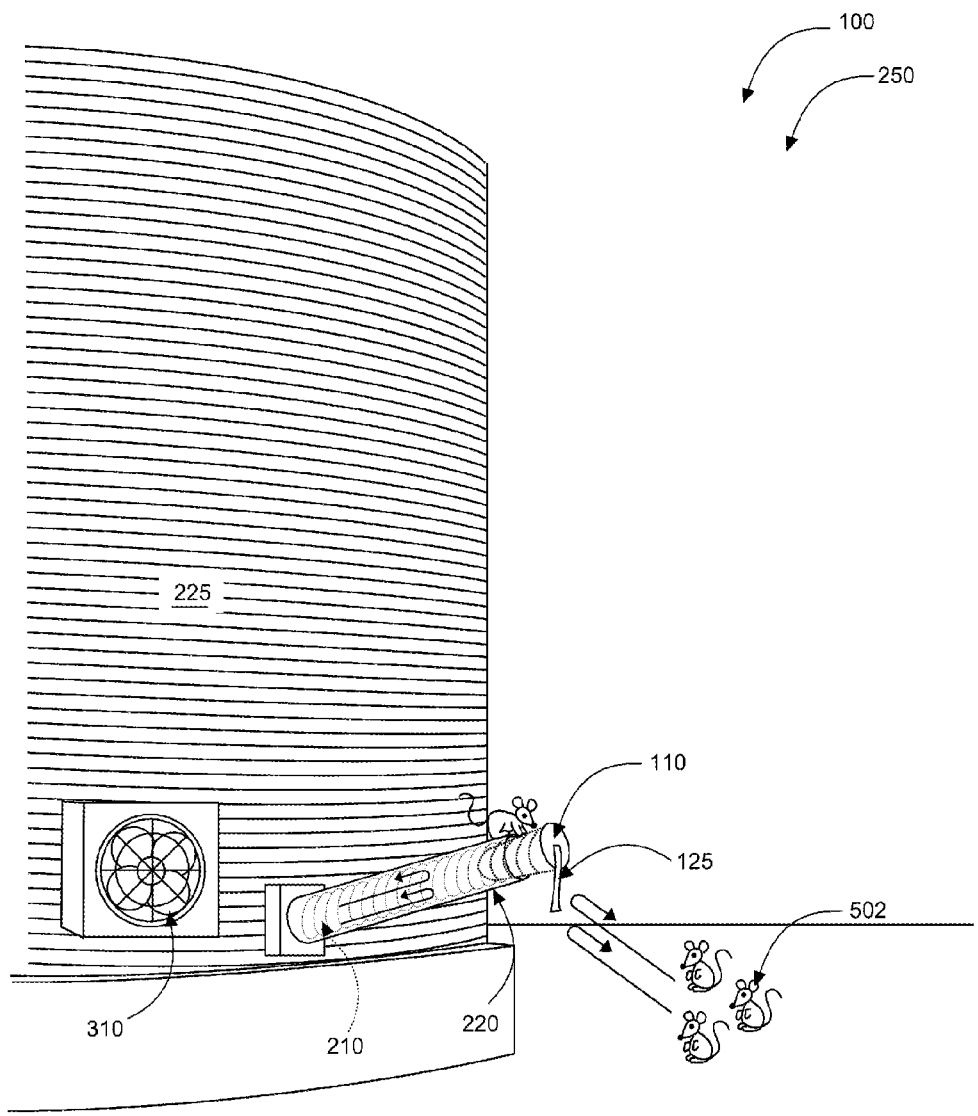
FIG. 5 is a perspective view illustrating helical auger plug systems as used to prevent rodents from entering a grain bin while retaining heat therein according to an embodiment of the present invention of FIG. 1.

In now referring to FIG. 5, illustrating helical auger plug systems 100 in an in-use condition 250 according to an embodiment of the present invention. As shown, auger plug 110 may prevent rodents 502 from entering grain bin 225. Without auger plug 110, rodents 502 may easily crawl through helical flightings 150 of auger 210 and infest grain 200. This may cost time and money and turn into a larger problems such as grain quality degradation and contamination. Therefore, auger plug 110 may be used to prevent rodents 502 from passing through helical flightings 150 of auger 210 while minimizing the loss of hot air generated from heating fan 310.

In a preferred embodiment of the present invention, auger plug 110 may comprise the shape and the appearance of an ear of corn. Auger plug 110 may therefore be yellow and may bear a cob-like appearance. The bright color of auger plug 110 may be easier for user 240 to spot from a distance. This particular embodiment having the cob of corn-shape appearance may further provide a more aesthetically pleasing auger plug 110, thereby attracting attention/appeal leading to increased commercialism. It should further be appreciated that helical auger plug systems 100 may be manufactured in an assortment of colors, shapes, and sizes as per buyer-preference.

In an alternative embodiment of the present invention (not shown), helical auger plug systems 100 may comprise auger plug 110 that may be inflatable. In the inflatable embodiment of the present invention, auger plug 110 may initially be inserted around helical flightings 150 of auger 210. For use, a minimal amount of air should be allowed into the unit enabling it to take shape. Auger plug 110 may then be inserted. Once auger plug 110 is in place, it may then be completely inflated until a tight seal is achieved. User 240 may inflate auger plug 110 to fill open space in between helical flightings 150. In the inflatable embodiment, helical auger plug systems 100 may be used to fit a variety of sized augers 210 as user 240 may inflate auger plug 210 to a user-preferred size.

Helical auger plug systems 100 may further comprise kit 699 wherein kit 699 includes: at least one auger plug 110, at least one removably attachable flag 125, and at least one set of user instructions. Kit 699 may be sold in either an inflatable or non-inflatable version. Auger plug 110 may be made available in an assortment of colors, shapes, and sizes. Flag 125 may also be available in different colors and designs, as previously mentioned.

Figure 6:
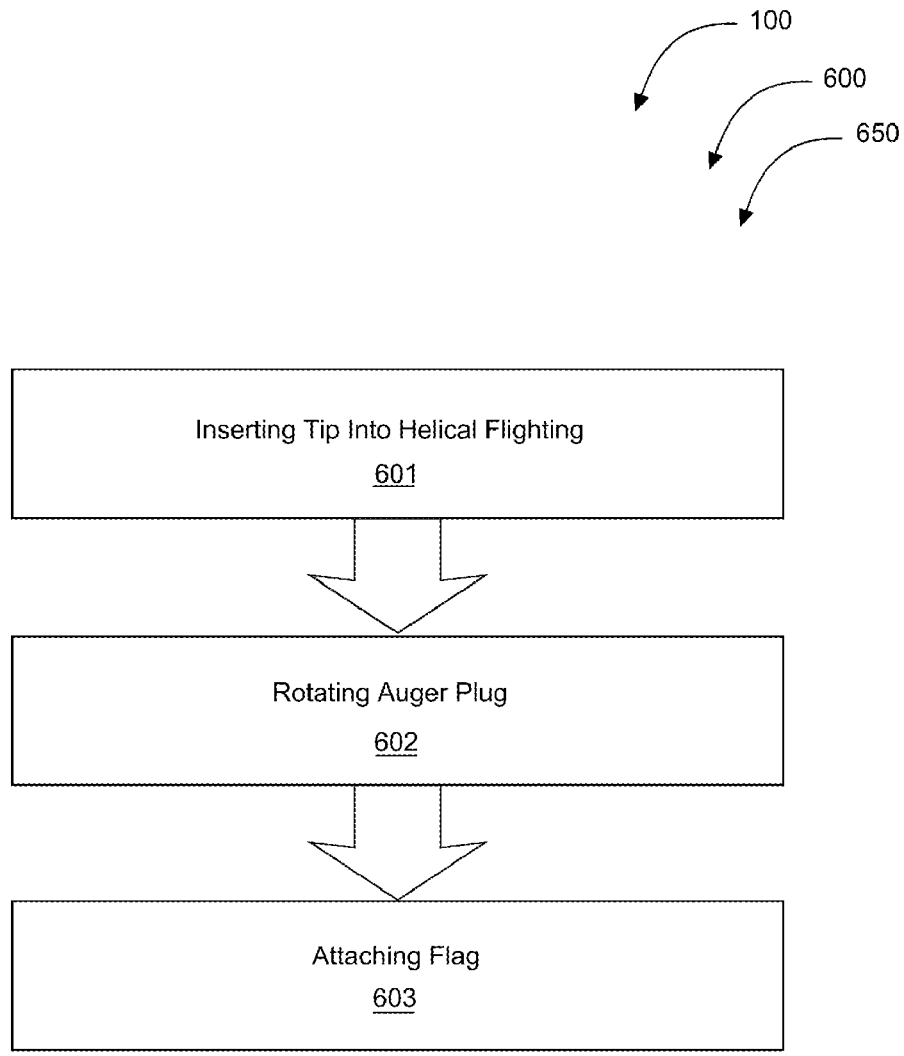
FIG. 6 is a flowchart illustrating a method of use for helical auger plug systems according to an embodiment of the present invention of FIGS. 1-5.

FIG. 6 is a flowchart illustrating a method of use 600 of helical auger plug systems 100 according to a preferred embodiment of the present invention of FIGS. 1-5. Method of use 600 may comprise the steps of: step one 601 inserting tip 140 of auger plug 110 into tubular encasement 220 of auger 210, step two 602 rotating auger plug 110 around auger 210 via helical flightings 150, and step three 603 attaching flag 125 to auger plug 110 thereby indicating in-use condition 250.

In the inflatable, alternative embodiment of the present invention, it should be noted that step two 602 comprises the additional step of inflating auger plug 110 once auger plug 110 is positioned around auger drill 210. Auger plug 110 may be inflated manually or via an air pump.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An auger flighting plug comprising:
   a plug member having a helical profile;
   a removably attachable flag;
   wherein said plug member, having said helical profile, is rotably insertable into a flighting on an auger;
   wherein said plug member serves as an isolator; and
   wherein said removably attachable flag provides an indicator of said auger flighting plug being in an insert-relationship within said flighting of said auger.

2. The auger flighting plug of claim 1 wherein said isolator serves as an insulator.

3. The auger flighting plug of claim 2 wherein said insulator acts as a barrier to restrict outward heatflow from a grain bin through said auger flighting during grain-drying operations.

4. The auger flighting plug of claim 2 wherein said isolator serves as an obstruction to prevent rodents from entering said flighting of said auger to enter a grain bin.

5. The auger flighting plug of claim 1 wherein said plug member having said helical profile is inflatable.

6. The auger flighting plug of claim 1 wherein said plug member having said helical profile is non-inflatable.

7. The auger flighting plug on claim 6 wherein said plug member having said helical profile comprises a corn-cob profile.

8. The auger flighting plug of claim 6 wherein said plug member having said helical profile comprises porous sponge material.

9. The auger flighting plug of claim 6 wherein said plug member having said helical profile comprises a rigid tip.

10. The auger flighting plug of claim 6 wherein said plug member having said helical profile comprises rubber.

11. The auger flighting plug of claim 1 wherein said removably attachable flag comprises a hook and loop fastener attacher.

12. The auger flighting plug of claim 1 wherein said removably attachable flag comprises at least one bright color.

13. The auger flighting plug of claim 7 wherein said plug member having said helical profile comprises a yellow color on said corn-profile.

14. The auger flighting plug of claim 5 wherein said inflatable said plug member having said helical profile is inflatable after being inserted into said flighting on said auger.

15. The auger flighting plug of claim 14 wherein said inflatable said plug member having said helical profile when inflated comes into a contact relationship between said flighting and an inner surface of an outer tube of said auger.

16. The auger flighting plug of claim 1 wherein said plug member, having said helical profile, is hand-rotatably insertable into said flighting on said auger.

17. An auger flighting plug positionable in a grain bin's unloading auger system comprising:

a plug member having a helical profile comprising a porous sponge material, a a corn-profile having a yellow color, and a plastic tip;

a removably attachable flag comprising a hook and loop fastener attacher and comprising at least one bright color;

wherein said plug member serves as an isolator and an insulator to conserve heat within said grain bin and also serves as an obstruction preventing rodents from entering said flighting of said auger; and wherein said removably attachable flag comprising said at least one bright color providing an indicator of said auger flighting plug being in an insert-relationship within a flighting tube of said auger.

18. The auger flighting plug of claim 17 wherein said auger flighting plug comprises a kit including:

at least one plug member;

at least one removably attachable flag; and at least one set of user instructions.

19. A method of inserting an auger flighting plug comprising the steps of:

rotatably-inserting said auger flighting plug into an auger tube in contact with a flighting; and positioning a flag outside of said auger tube such that said flag serves as an indicator-reminder of a presence of said auger flighting plug within said auger tube.

20. The method of inserting an auger flighting plug of claim 19 further comprising the step of commencing a grain drying process.

\* \* \* \* \*